United States Patent Office 3,265,586
Patented August 9, 1966

3,265,586
STARCH SACCHARIFICATION PROCESS
Charles Edward Land, Jr., Wyckoff, N.J., and Richard Russell Barton, Elkhart, Ind., assignors to Miles Laboratories, Inc., Elkhart, Ind., a corporation of Indiana
No Drawing. Filed June 11, 1965, Ser. No. 463,356
8 Claims. (Cl. 195—31)

This application is a continuation-in-part of U.S. Serial No. 260,904, filed February 25, 1963, now abandoned.

This invention relates to the production of sugar syrups by the enzymatic liquefaction and saccharification of starch slurries. More particularly, this invention relates to a process for the conversion of starch slurries to sugar syrups by the use of an alpha amylase enzyme composition having both liquefying and saccharifying activities.

Starch is a polysaccharide widely distributed in nature. It is found, for example, in such crop plants as corn, wheat, sweet potatoes, white potatoes, rice and tapioca. Starch can be extracted from a large number of plant seeds, bulbs and tubers. The commercial starches can be prepared from any of these sources by leaching starch granules out of portions of the plants with water. The appearance of these granules under a microscope is characteristic of the source.

It is known that starch granules can be ruptured by treating starch with hydrochloric acid at relatively high temperatures and pressures. Liquefaction and some saccharification of the starch is thereby accomplished. Liquefied starch has found many commercial uses. For example, it is used in laundries, as well as in the processing of various foods. One particularly important use of starch is in the preparation of sugar containing syrups which have been prepared by various acid and enzymatic treatments of liquefied starch.

Each of the methods available for the production of sugar syrups from starch requires first, the liquefaction of starch and second, the saccharification thereof, that is, the conversion of the starch molecule into various sugar fragments. The liquefaction step produces dextrins and therefore is also known as the dextrinizing step. Such processes for example, utilize acid hydrolysis for liquefaction followed by a treatment of the liquefied starch with various enzyme compositions such as amylases, glucamylases, maltases, and other enzymes. Some processes have utilized one or more enzymes to accomplish the desired degradation of the starch molecule. None, however, has produced sugar syrups of the desired composition without a multiplicity of process steps which renders such processes more expensive to perform than has been found necessary.

It is accordingly an object of this invention to provide a process for the production of sugar syrups from starch which is commercially more efficient than the processes previously known.

It is another object of this invention to provide syrups having a composition which may be characterized as high maltose, low dextrose content.

Yet another object of this invention is to provide a process which is capable of converting starch slurries to sugar syrups having commercially desirable compositions.

Other objects and advantages of this invention will be apparent from the following detailed disclosure and description.

Briefly described, the invention comprises employing a bacterial alpha amylase composition having both dextrinizing and saccharifying activities to convert starch slurries directly to sugar syrups. The conversion is performed by utilizing two different temperature-time stages for the dextrinizing and saccharifying, respectively. It has been found that the dextrinizing step may be first carried out at a carefully controlled temperature range for a short time period in order to attain a substantially complete liquefaction of the starch slurry to dextrins. Liquefaction in this manner preserves the saccharifying activity of the bacterial alpha amylase. The temperature is then lowered and maintained at this lower level for a much longer period of time in order to allow the enzyme composition to convert the liquefied starch molecules into low molecular weight poly-saccharides, mainly maltose and maltotriose units. Unexpectedly, the relatively high liquefaction temperatures employed in the first stage do not destroy the saccharifying activity of the enzyme composition.

In a preferred embodiment of the process of our invention an aqueous slurry of starch at a pH of about from pH 5.5 to pH 7.5, is treated with the bacterial apha amylase at a temperature at which liquefaction can readily take place, for example, a temperature in the range of about from 85° C. to 90° C. and is held at this temperature for only a short period of time. This period may be about from 2 to 20 minutes. The temperature is then lowered to the optimum temperature for saccharification of the liquefied starch by the enzyme. This temperature has been found to be within the range of about from 50° C. to 70° C. The mixture of enzyme and liquefied starch is maintained at this temperature until an optimum degree of saccharification is realized. Usually a period of about from 48 to 96 hours is sufficient for the desired saccharification to occur.

The degree of saccharification which is attained depends to some extent upon the purity of the starch used. For the purpose of the present invention the starch slurry is preferably made up with prime starch. Prime starch, which can be derived from any starch source, has a purity of approximately 99%. It can be obtained commercially in two particle size ranges. The coarser material is known as pearl starch while the finer material is known as powdered starch. Both sizes are suitable for use in this invention. Many prime starches available commercially have been treated with a buffer so that they can be liquefied by hot water alone or by a mild acid liquefaction with little degradation. Such buffered starches are not desirable for this process.

After prolonged storage even prime starch often undergoes retrogradation when heated to temperatures in the range necessary for liquefaction. Thus the prime starch used should be freshly prepared. The term "starch" as used hereinafter refers to fresh unbuffered prime starch.

The concentration of the starch slurry can very widely from about 10 to 50 weight percent, within the range of 30 to 40 weight percent being preferred.

The degree of saccharification attained in the second stage of the process of this invention may be expressed as the dextrose equivalent. The dextrose equivalent (D.E.) is defined as the total reducing sugars expressed as dextrose and calculated as a weight percentage of the dry solids of the sugar syrup. For commercial use in the confectionery, baking and ice cream industries sugar syrups must have a D.E. of about 40. Syrups having lower D.E.'s, for example about 35 D.E., are not acceptable in such industries and are only useful for certain non-critical employment in other industries, particularly in the animal feed industry. Hence, sugar syrups intended for large volume commercialization must exhibit a D.E. of approximately 40. The present process enables a commercially acceptable sugar syrup having a D.E. in the range of about from 38 D.E. to 42 D.E. to be produced in a manner which circumvents the problems of the prior art methods.

The syrup produced by the present process may be further purified in order to clarify the resulting hydrolyzate, for example, by filtration or centrifugation. Additional refining of the filtrate or centrifugate may be accomplished in order to produce a syrup of any desired solids content.

The bacterial alpha amylase enzyme compositions which have been found effective in the present process are those derived from the various strains of *Bacillus subtilis*. Such enzyme compositions are available commercially, for example, as "Takamine HT–1000" available from Miles Laboratories, Inc. The use of other bacterial alpha amylases does not always result in the production of sugar syrups having D.E. values in the acceptable range of 38 to 42.

The concentration of the bacterial alpha amylase used in the starch slurry may be expressed in enzyme units per mg. of starch on a dry weight basis. One unit of alpha amylase is defined as that amount of enzyme which will produce one milligram of sugar calculated as maltose from a two weight percent starch solution in 30 minutes at pH 4 to 5 and a temperature of 40° C. according to the assay procedure report by Norma MacLeod and Robert Robinson in the Journal of Biochemistry 23, 517 (1929). The minimum concentration of the bacterial alpha amylase which can be used to attain dextrose equivalents in the desired range is 0.08 unit per mg. of starch on a dry basis. Since excess amounts of the enzyme do not interfere with the process there is no maximum concentration limit. The preferred range of concentrations is from 0.109 unit per mg. of starch to 0.300 unit per mg. of starch.

The enzyme concentration can also be expressed in terms of enzyme units per milliliter of starch slurry. For a 40 weight percent slurry a preferred concentration is 47 units per ml. (0.1175 unit per mg. dry starch).

In some instances it has been found desirable to include with the enzyme composition a material or materials to improve the heat stability of the enzyme. Such materials may be added to the starch slurry prior to the liquefaction stage. Materials suitable for this purpose include water soluble salts such as salts of sodium or calcium. For example, sodium chloride, calcium acetate and calcium sulfate (gypsum) may be used. Mixtures of these materials also may be used.

The invention will be better understood with reference to the following examples which are included for purposes of illustration and are not to be construed to limit the scope of the invention as defined in the appended claims.

EXAMPLE 1

To a 40% by weight aqueous slurry of corn starch at pH 5.5 were added 47 units per ml. of a *Bacillus subtilis* derived alpha amylase ("Takamine HT–1000"). The enzyme concentration on a weight basis was 0.1175 unit per mg. dry starch. The mixture was heated to 90° C. with stirring and held at this temperature for 10 minutes. It was then cooled to 60° C. and held for 96 hours. The hydrolyzate was filtered through a filter coated with diatomaceous earth. The filtrate was heated at 70° C. for 30 minutes with 0.25 weight percent of activated charcoal and refiltered through uncoated filter paper. This filtrate was then concentrated to 75% solids. The resulting syrup was colorless and water clear. It showed a specific gravity of 1.3768 and an analysis of 9.15% glucose, 27.7% maltose and 33.2% maltotriose and exhibited a dextrose equivalent of 41.4.

EXAMPLE 2

To a 40% by weight aqueous slurry of corn starch at pH 5.5 were added 21.8 units per ml. of a *Bacillus subtilis* derived alpha amylase and 0.0635 mg. per ml. of gypsum. The enzyme concentration was 0.0545 unit per mg. of dry starch. The slurry was treated as described in Example 1. After incubation for 96 hours, the resulting syrup gave a specific gravity of 1.173, a solids concentration of 37.1 weight percent and a D.E. of 35.8.

It can be seen that the 0.0545 unit per mg. of dry starch enzyme concentration resulted in an insufficient saccharification and an unsatisfactory dextrose equivalent.

EXAMPLE 3

To a 40 weight percent aqueous slurry of corn starch at pH 5.5 were added 49.7 units per ml. of a *Bacillus subtilis* derived alpha amylase (0.124 unit per mg. dry starch) and 0.125 mg. per ml. of gypsum. The slurry was heated to 90° C. for 10 minutes, then cooled to 60° C. and held at that temperature for 96 hours. The resulting syrup exhibited a specific gravity of 1.160 and had a solids content of 38.7 weight percent. The dextrose equivalent was 38.5.

EXAMPLE 4

To a 40 weight percent aqueous slurry of corn starch at pH 5.5 were added 43.5 units of a *Bacillus subtilis* derived alpha amylase, (0.109 unit per mg. dry starch), 0.127 mg. per ml. of gypsum and 0.318 mg. per ml. of sodium chloride. The slurry was then treated as described in Example 1. The resulting syrup exhibited a specific gravity of 1.161 and had a solids content of 36.0 weight percent. The dextrose equivalent was 39.2.

EXAMPLE 5

To a 50 weight percent aqueous slurry of corn starch at pH 5.5 were added 132 units per ml. of a *Bacillus subtilis* derived alpha amylase (0.264 unit per mg. dry starch) and 1.33 mg. per ml. of gypsum. The slurry was heated to 90° C. for 10 minutes, cooled to 60° C. and then incubated for 24 hours at 60° C. The hydrolyzate syrup exhibited a specific gravity of 1.240 and had a solids content of 50.0 weight percent. The dextrose equivalent was only 31.8 D.E., a commercially unacceptable value, due to the fact that the second stage saccharification was carried out for only 24 hours. This is a shorter time period than the required 48 to 96 hours.

The results obtained in the preceding examples are summarized in Table 1.

*Table 1*

| Example No. | Specific Gravity | Solids, Percent | D.E. |
| --- | --- | --- | --- |
| 1 | 1.3768 | 75.0 | 41.4 |
| 2 | 1.173 | 37.1 | 35.8 |
| 3 | 1.160 | 38.7 | 38.5 |
| 4 | 1.161 | 36.0 | 39.2 |
| 5 | 1.240 | 50.0 | 31.8 |

In summary, this invention provides an improved process for producing sugar syrups from starch slurries in which an alpha amylase enzyme composition having both dextrinizing and saccharifying activities, such as that derived from *Bacillus subtilis*, is used. A starch slurry is first heated to a relatively high temperature for a short time and then cooled to an optimum temperature for saccharification. Syrups having dextrose equivalents in the commercial range of about from 38 D.E. to 42 D.E. may be produced in accordance with the invention.

What is claimed is:

1. A process for producing a sugar syrup from starch which consist essentially of treating an aqueous slurry of starch with a *Bacillus subtilis* derived alpha amylase enzyme composition having both dextrinizing and saccharifying activities at a temperature of about from 85° C. to 90° C. for a period of about from 2–20 minutes to liquefy substantially all of the starch present, cooling the starch slurry to a temperature of about from 50° to 70° C. and maintaining the liquefied starch at a temperature in this range for a period of about from 48–96 hours to produce a syrup having a dextrose equivalent of about from 38 D.E. to 42 D.E.

2. The process of claim 1 wherein said treating step is conducted at a pH of from about pH 5.5 to pH 7.5.

3. The process of claim 1 wherein said treating step is conducted in the presence of heat stabilizing material.

4. The process of claim 1 wherein said treating step is conducted in the presence of a heat stabilizing material selected from the group consisting of water soluble salts of sodium and water soluble salts of calcium.

5. A process for producing a sugar syrup from starch which consists essentially of treating an aqueous slurry of starch with at least about 0.08 unit per mg. of dry starch of a *Bacillus subtilis* derived alpha amylase composition having both dextrinizing and saccharifying activities at a temperature of about from 85° C. to 90° C. for a period of about from 2–20 minutes to liquefy substantially all of the starch present, cooling the starch slurry to a temperature of about from 50° C. to 70° C. and maintaining the liquefied starch at a temperature in this range for a period of about from 48–96 hours to produce a syrup having a dextrose equivalent of about from 38 D.E. to 42 D.E.

6. The process of claim 5 wherein the treating step is conducted at a pH of from about pH 5.5 to 7.5.

7. The process of claim 5 wherein said treating step is conducted in the presence of a heat stabilizing material.

8. The process of claim 5 wherein said treating step is conducted in the presence of a heat stabilizing material selected from the group consisting of water soluble salts of sodium and water soluble salts of calcium.

References Cited by the Examiner

UNITED STATES PATENTS

| | | | |
|---|---|---|---|
| 2,891,869 | 6/1959 | Langlois | 195—31 X |
| 3,039,936 | 6/1962 | Lenney et al. | 195—11 |

OTHER REFERENCES

Industrial Microbiology, 3rd ed., 1959, pp. 497–503 and 853.

A. LOUIS MONACELL, *Primary Examiner.*

L. M. SHAPIRO, *Assistant Examiner.*